United States Patent
DeMay et al.

(10) Patent No.: US 6,204,772 B1
(45) Date of Patent: Mar. 20, 2001

(54) METHOD AND APPARATUS FOR MONITORING THE POSITION OF A MACHINE

(75) Inventors: Rodney W. DeMay; David B. Vernon, both of Peoria; Daniel C. Wood, East Peoria; Donna J. Murr, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,569

(22) Filed: Dec. 16, 1999

(51) Int. Cl.⁷ ................................................. G08B 21/00
(52) U.S. Cl. .................... 340/686.1; 340/989; 340/426; 340/505; 340/506; 340/522; 340/825.32; 701/1; 701/66; 701/207
(58) Field of Search ................................. 340/686.1, 988, 340/989, 990, 991, 993, 573.1, 573.4, 426, 430, 438, 447, 505, 506, 522, 524, 825.31, 825.32; 701/1, 2, 29, 35, 37, 66, 117, 207, 208

(56) References Cited

U.S. PATENT DOCUMENTS

| | | | |
|---|---|---|---|
| 3,573,783 | 4/1971 | Fudaley | 340/561 |
| 3,599,195 | 8/1971 | Boyko | 340/561 |
| 3,623,159 | 11/1971 | Bell et al. | 340/564 |
| 3,727,206 | 4/1973 | Geil et al. | 340/544 |
| 3,727,208 | 4/1973 | Anderson et al. | 340/562 |
| 3,812,484 | 5/1974 | Miller et al. | 340/551 |
| 3,815,131 | 6/1974 | Dautel et al. | 342/28 |
| 3,938,128 | 2/1976 | Pidsosny et al. | 340/309.15 |
| 3,956,743 | 5/1976 | Geiszler et al. | 340/538 |
| 4,001,771 | 1/1977 | Amrine et al. | 367/129 |
| 4,053,877 | 10/1977 | Torlesse et al. | 340/552 |
| 4,064,499 | 12/1977 | Geiszler et al. | 340/508 |
| 4,079,361 | 3/1978 | Woode | 342/27 |
| 4,091,367 | 5/1978 | Harman | 340/552 |
| 4,134,101 | 1/1979 | Jones, Jr. | 340/451.4 |
| 4,169,260 | 9/1979 | Bayer | 340/562 |
| 4,174,518 | 11/1979 | Mongeon | 340/561 |
| 4,191,953 | 3/1980 | Woode | 340/552 |
| 4,197,529 | 4/1980 | Ramstedt et al. | 340/566 |
| 4,236,145 | 11/1980 | Schorsch | 340/309.15 |
| 4,258,421 | 3/1981 | Juhasz et al. | 701/35 |
| 4,346,373 | 8/1982 | Hassman | 340/561 |
| 4,376,298 | 3/1983 | Sokol et al. | 701/34 |
| 4,527,151 | 7/1985 | Byrne | 340/554 |
| 4,551,801 | 11/1985 | Sokol | 701/32 |
| 4,595,924 | 6/1986 | Gehman | 342/28 |
| 4,613,939 | 9/1986 | Paine . | |
| 4,651,157 | * 3/1987 | Gray et al. | 342/457 |
| 4,656,463 | 4/1987 | Anders et al. | 340/513.4 |
| 4,750,197 | 6/1988 | Denekamp et al. | 455/404 |
| 4,792,804 | 12/1988 | Rubechini | 342/27 |
| 4,807,127 | 2/1989 | Tenmoku et al. | 701/207 |
| 4,852,680 | * 8/1989 | Brown et al. | 180/287 |
| 4,887,069 | 12/1989 | Maki et al. | 340/552 |
| 4,926,331 | 5/1990 | Windle et al. | 701/35 |
| 5,053,768 | 10/1991 | Dix, Jr. | 340/988 |
| 5,111,401 | 5/1992 | Everett, Jr. et al. | 701/24 |

(List continued on next page.)

*Primary Examiner*—Jeffery A. Hofsass
*Assistant Examiner*—Toan Pham
(74) *Attorney, Agent, or Firm*—W. Bryan McPherson, III

(57) ABSTRACT

The present invention provides a method and apparatus for monitoring the operation of a mobile machine. The machine includes a mobile communicator adapted to communicate with a remote monitoring station. The method includes the steps of receiving a configuration message from the remote monitoring station via a wireless communication link, comparing at least one of a current machine position to the configuration information a current machine time of operation to the configuration message, and sending an alarm message to the remote monitoring station in response the comparison.

32 Claims, 5 Drawing Sheets

U.S. PATENT DOCUMENTS

| | | | |
|---|---|---|---|
| 5,170,849 | 12/1992 | Nikkel et al. .............................. 172/6 |
| 5,194,844 | 3/1993 | Zelda ................................... 340/426 |
| 5,210,521 | 5/1993 | Hojell et al. ......................... 340/436 |
| 5,223,817 | 6/1993 | Hoyle .................................. 340/554 |
| 5,243,530 | 9/1993 | Stanifer et al. ...................... 701/219 |
| 5,311,197 | * 5/1994 | Sorden et al. ....................... 342/457 |
| 5,400,018 | 3/1995 | Scholl et al. ....................... 340/10.3 |
| 5,402,106 | 3/1995 | DiPaolo et al. ................... 340/568.5 |
| 5,438,517 | 8/1995 | Sennott et al. ...................... 701/213 |
| 5,440,303 | 8/1995 | Kinoshita ............................ 340/901 |
| 5,442,558 | 8/1995 | Kyrtsos et al. ...................... 701/215 |
| 5,446,390 | 8/1995 | Marks .................................. 324/555 |
| 5,463,567 | 10/1995 | Boen et al. .......................... 702/187 |
| 5,469,356 | 11/1995 | Hawkins et al. ...................... 701/48 |
| 5,475,367 | 12/1995 | Prevost ............................. 340/568.8 |
| 5,497,149 | 3/1996 | Fast .................................... 340/988 |
| 5,581,464 | 12/1996 | Woll et al. ............................ 701/35 |
| 5,590,040 | 12/1996 | Abe et al. ............................. 701/35 |
| 5,594,650 | 1/1997 | Shah et al. .......................... 701/207 |
| 5,600,558 | * 2/1997 | Mearek et al. ................. 364/424.04 |
| 5,610,815 | 3/1997 | Gudat et al. .......................... 701/23 |
| 5,612,668 | 3/1997 | Scott ................................... 340/426 |
| 5,619,412 | * 4/1997 | Hapka .......................... 364/424.045 |
| 5,635,693 | 6/1997 | Benson et al. .................... 340/10.33 |
| 5,636,122 | 6/1997 | Shah et al. .......................... 701/207 |
| 5,646,844 | 7/1997 | Gudat et al. ........................ 701/208 |
| 5,646,845 | 7/1997 | Gudat et al. .......................... 701/41 |
| 5,659,470 | 8/1997 | Goska et al. .......................... 701/35 |
| 5,661,474 | 8/1997 | Douglas ............................... 340/940 |
| 5,684,476 | 11/1997 | Anderson ............................ 340/988 |
| 5,705,984 | 1/1998 | Wilson ................................ 340/561 |
| 5,724,316 | 3/1998 | Brunts .................................. 368/10 |
| 5,742,915 | 4/1998 | Stafford ................................ 701/35 |
| 5,754,965 | 5/1998 | Hagenbuch ........................... 701/35 |
| 5,758,313 | 5/1998 | Shah et al. .......................... 455/456 |
| 5,760,686 | 6/1998 | Toman ................................. 340/540 |
| 5,767,804 | 6/1998 | Murphy .......................... 342/357.09 |
| 5,774,876 | 6/1998 | Woolley et al. ....................... 705/28 |
| 5,796,178 | 8/1998 | Onuma .............................. 307/10.2 |
| 5,796,365 | 8/1998 | Lewis ............................ 342/357.03 |
| 5,801,618 | 9/1998 | Jenkins ................................ 340/426 |
| 5,806,016 | 9/1998 | Henderson et al. ................. 701/207 |
| 5,844,473 | 12/1998 | Kaman ................................ 340/439 |
| 5,852,351 | 12/1998 | Canada et al. ...................... 318/490 |
| 5,870,029 | 2/1999 | Otto et al. ........................ 340/825.36 |
| 5,880,679 | * 3/1999 | Lenart et al. ................... 340/825.31 |
| 5,883,598 | 3/1999 | Parl et al. ............................ 342/457 |
| 5,884,216 | 3/1999 | Shah et al. .......................... 701/207 |
| 5,887,269 | 3/1999 | Brunts et al. ........................ 701/207 |
| 5,894,266 | * 4/1999 | Wood, Jr. et al. ................... 340/539 |
| 5,895,436 | * 4/1999 | Savoie et al. ....................... 701/214 |
| 5,917,405 | 6/1999 | Joao .................................... 340/426 |
| 5,917,433 | 6/1999 | Keillor et al. ....................... 340/989 |
| 5,922,040 | 7/1999 | Prabhakaran ........................ 701/117 |

* cited by examiner

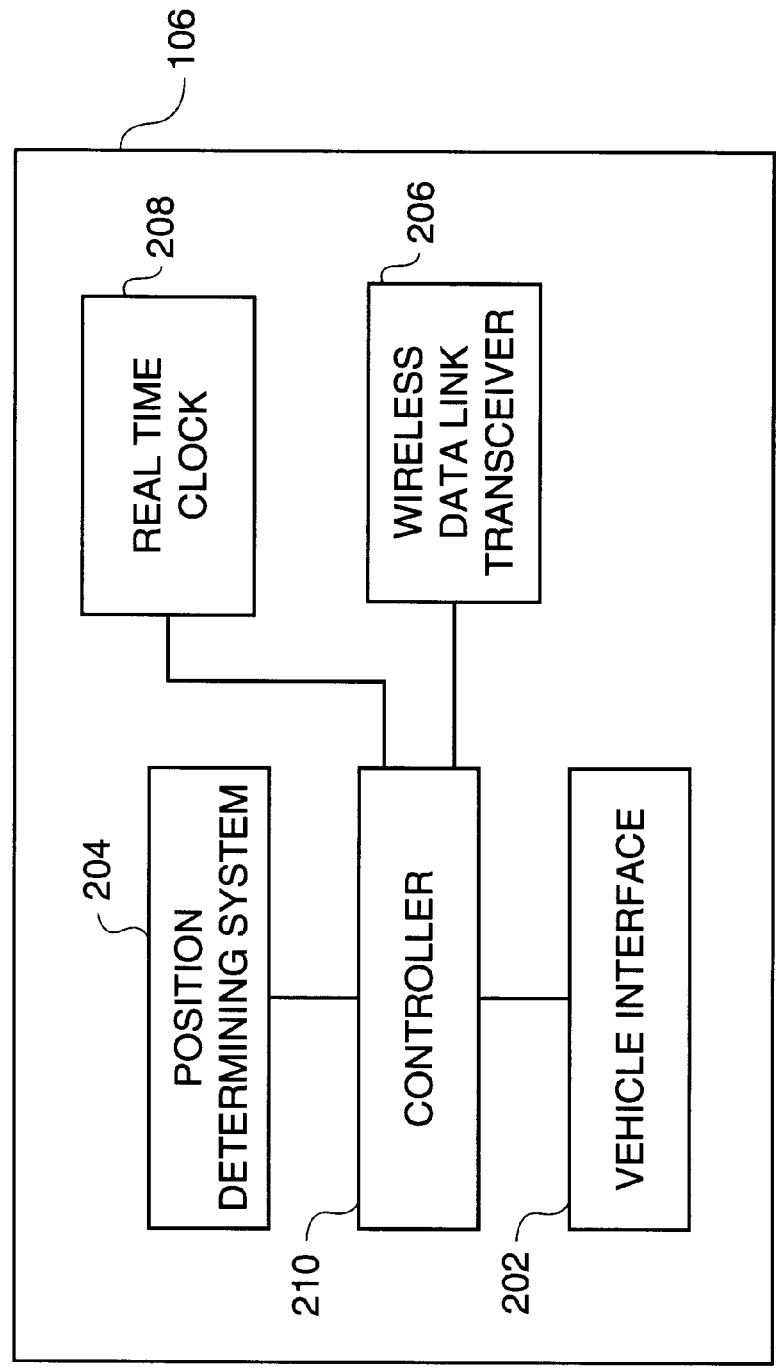

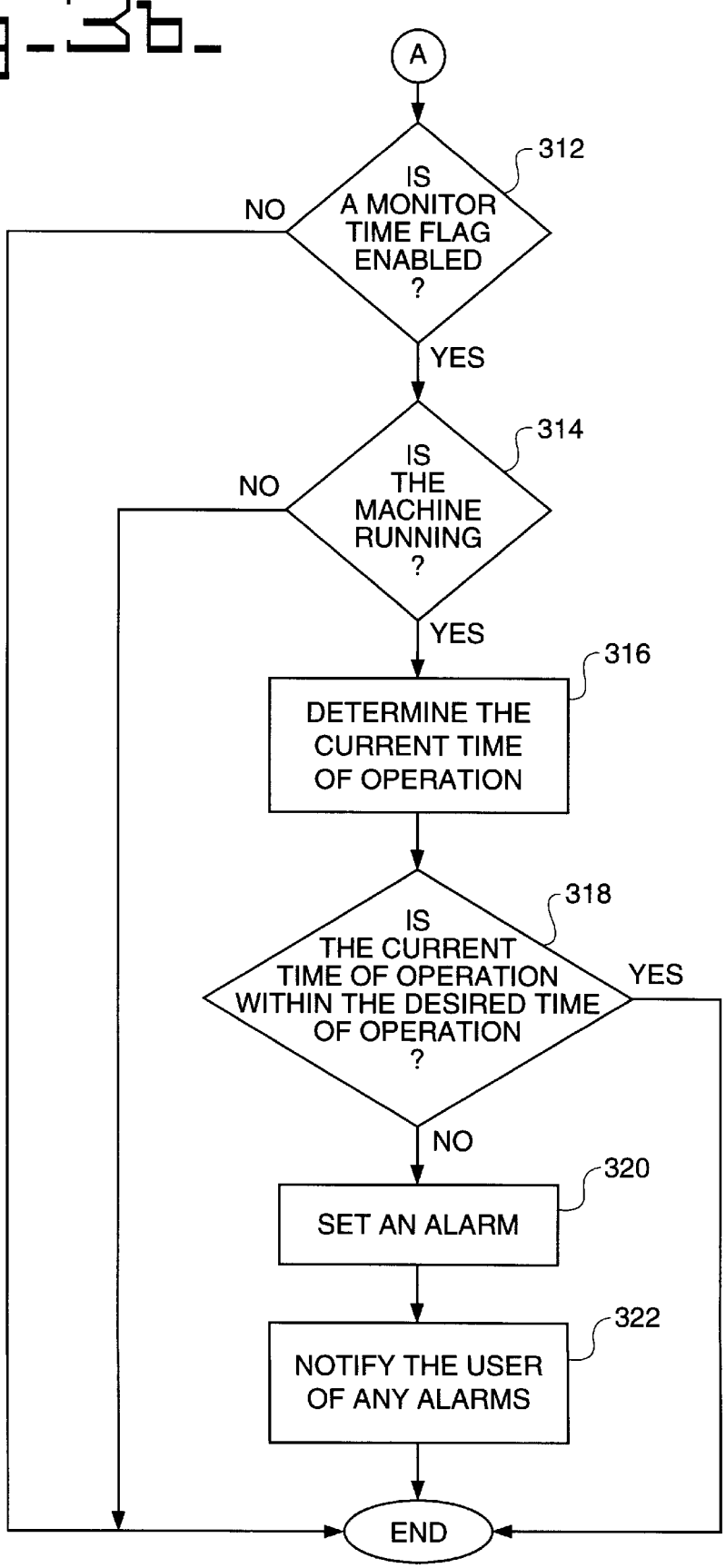
Fig_3b_

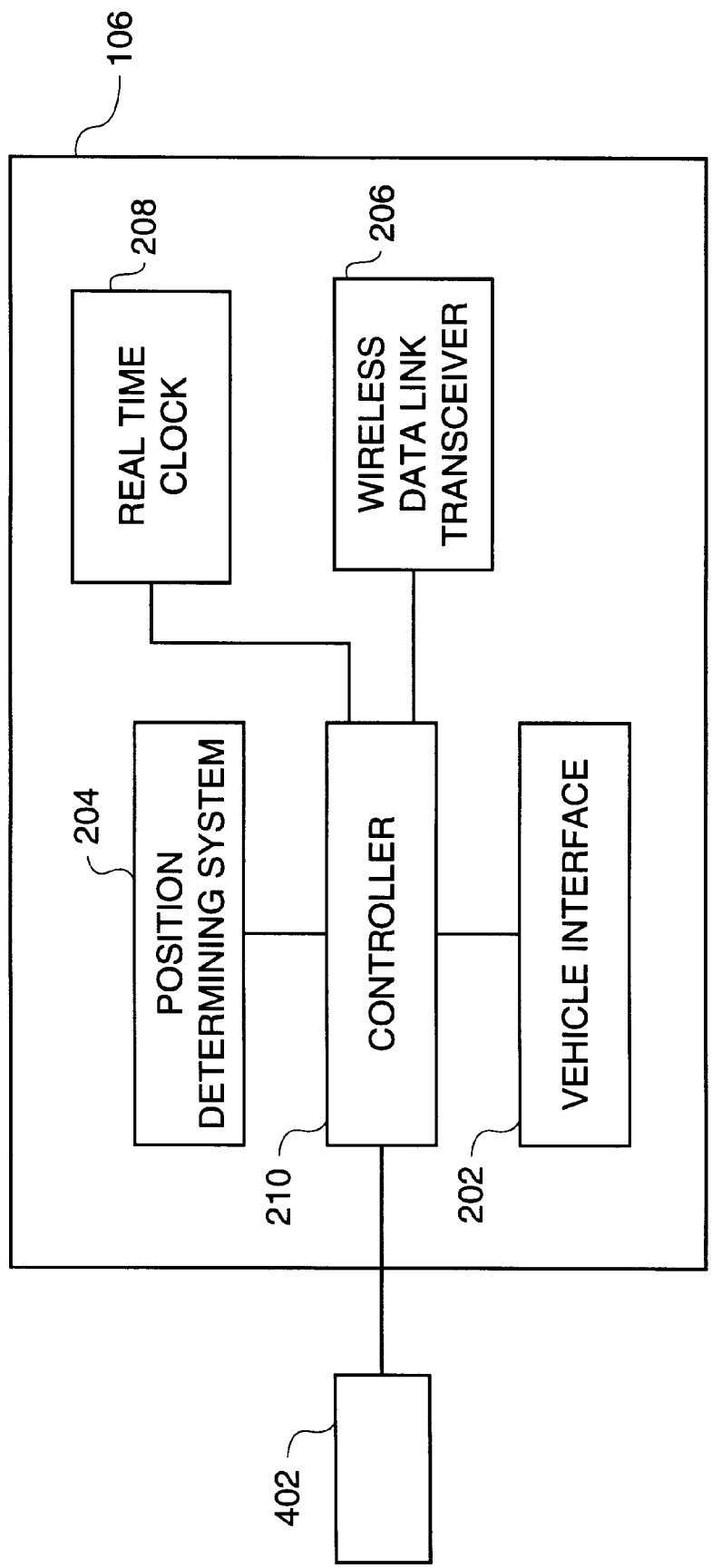

METHOD AND APPARATUS FOR MONITORING THE POSITION OF A MACHINE

TECHNICAL FIELD

The present invention relates generally to monitoring the operation of an earth moving machine, and more particularly, to a method and apparatus for determining and reporting the position and time of operation of a machine.

BACKGROUND ART

In some working environments, a dealer will purchase earth moving machines and rent them to various operators, such as mine operators. The operators may work in a variety of locations throughout a country, or the world. The dealers may desire to track the movement of the rented earth moving machines. For example the dealer may desire to know when the machine is entering a service area so the appropriate service personnel may be alerted and ready for the machine. In addition mine site operators may want to track the operation of the machine across the mine site, making sure the machine operates in designated areas. In addition, dealers and mine site operators may desire to track the time of operation of the vehicle. For example, if a normal work shift is seven a.m. to five p.m. and the machine is started and operated at two a.m., then the machine may be in the process of being stolen. In addition, if the machines position leaves a designated area, the machine may be in the process of being stolen. Current systems are unable to provide a remotely reconfigurable position and time of operation monitoring capability that integrates the machines, remote data facilities and end-users.

The present invention is directed to overcome one or more of the problems set forth above.

DISCLOSURE OF THE INVENTION

In one aspect of the present invention, a method for monitoring the operation of a mobile machine is disclosed. The machine includes a mobile communicator adapted to communicate with a remote monitoring station. The method includes the steps of receiving a configuration message from the remote monitoring station via a wireless communication link, comparing at least one of a current machine position to the configuration message and a current machine time of operation to the configuration message, and sending an alarm message to the remote monitoring station in response the comparison.

In another aspect of the present invention, a method for monitoring the operation of a mobile machine is disclosed. The machine includes a mobile communicator adapted to communicate with a remote monitoring station. The method includes the steps of receiving a configuration message from the remote monitoring station via a wireless communication link, the configuration message including at least one of a geographic data packet and a time data packet, comparing a current machine position to the geographic data packet, comparing a current machine time of operation to the time data packet, and sending an alarm message to the remote monitoring station in response to either the position comparison or the time of operation comparison.

In yet another aspect of the present invention, a system adapted to monitor the operation of a mobile machine is disclosed. The system includes a remote monitoring station adapted to generate a configuration message, a mobile communicator adapted to receive the configuration message and responsively compare at least one of a current machine position to the configuration message and a current machine time of operation to the configuration message, and send an alarm message to the remote monitoring station in response the comparison, and a wireless communication link adapted to deliver the configuration message from the remote monitoring station to the mobile communicator.

BRIEF DESCRIPTION OF THE DRAWINGS

FIG. 2 is an illustration of one embodiment of a mobile communicator;

FIG. 4 is an illustration of one embodiment of a mobile communicator.

BEST MODE FOR CARRYING OUT THE INVENTION

Figure 1:
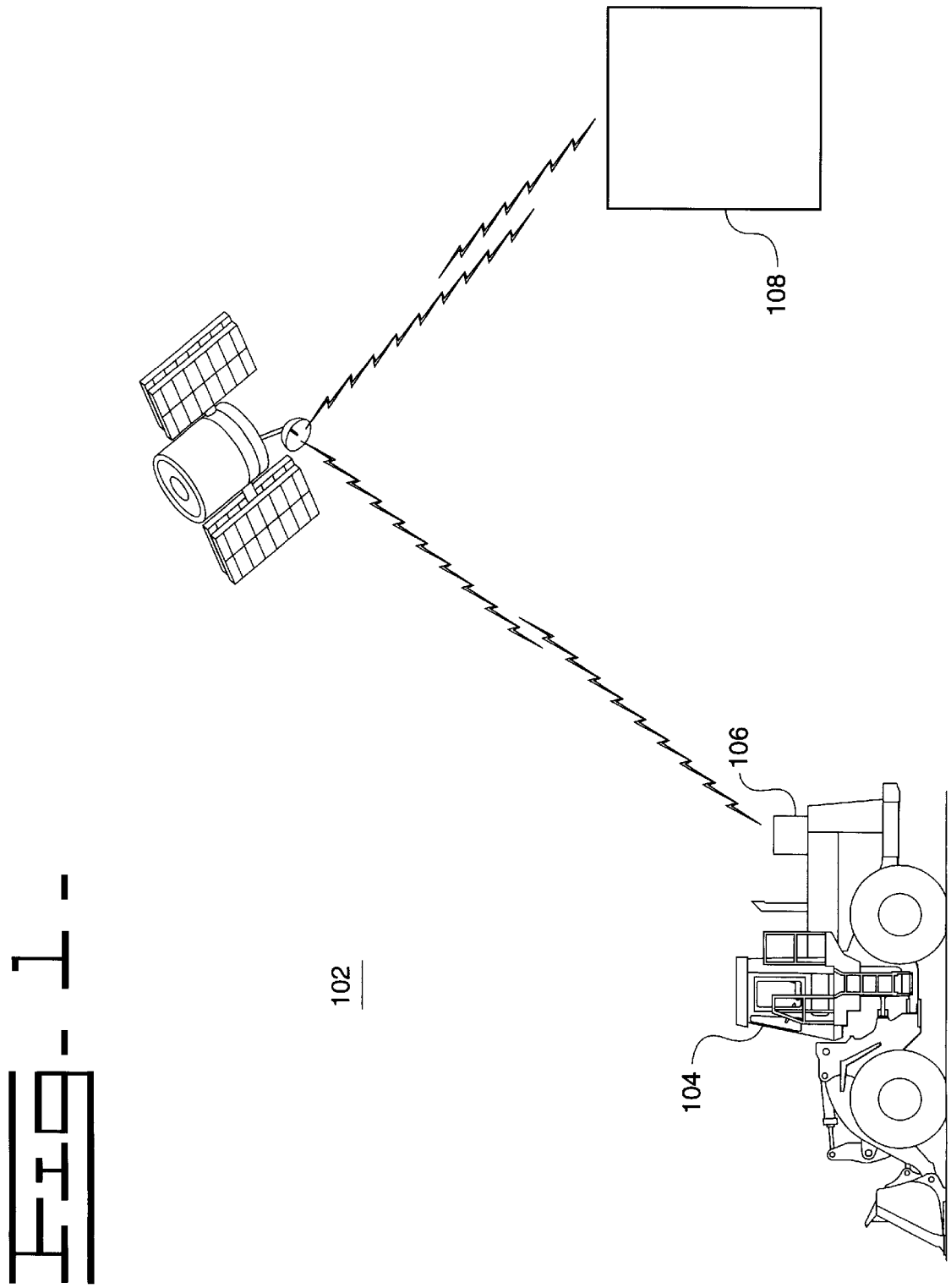
FIG. 1 is an illustration of one embodiment of a mobile monitoring system.

The present invention provides a method and apparatus for monitoring the operation of a mobile machine. FIG. 1 is an illustration of one embodiment of a mobile machine monitoring system 102. The system 102 includes a mobile communicator 106, located with a machine 104, and adapted to communicate with a remote monitoring station 108. In the preferred embodiment, the machine 104 is an earth moving machine, however, the invention is equally applicable to other applications and machines such as generator sets, pumps, and stationary and marine engine applications.

The mobile communicator 106 is located with the machine 104 to be monitored. FIG. 2 illustrates one embodiment of a mobile communicator 106. In one embodiment, the communicator 106 is electronically connected, e.g., via a machine interface 202, to the machine 104 in order to receive power from the machine 104, and transfer machine related information to and from the machine 104. In the preferred embodiment, the mobile communicator 106 may include a position determining system 204. The position determining system may include a GPS receiver and associated hardware and software, for receiving and determining machine location related information. Based on the location information, the mobile communicator 106 may determine the location of the machine 104. Alternatively, the position determining system 204 may be located on the machine 104, and the machine location information delivered to the mobile communicator 106 as needed.

The mobile communicator 106 includes a wireless data link transceiver 206 to communicate with a remote monitoring station 108, via a wireless communication link. In the preferred embodiment, the wireless communication link includes a satellite data link. Alternatively, or in conjunction with the satellite data link, the wireless communication link may include a cellular telephone communication link, radio link, or any wireless transceiver device and associated data link. In one embodiment, the mobile communicator 106 may include a local data link for access by service personnel. The mobile communicator 106 includes a real time clock 208 from which the time of day and date may be determined.

The mobile communicator 106 also includes a controller 210. The controller 210 is adapted to receive configuration messages from the remote monitoring station 108, position information from the positioning system 204, time information from the real time clock 208, and responsively monitor the position and time of operation of the machine 104, set an alarm in response to the monitoring when appropriate, and deliver monitoring information to the remote monitoring station 108.

The remote monitoring station 108 is adapted to communicate with the mobile communicator 106 via the wireless communication data link. Examples of a remote monitoring station 108 include a call-center, a corporate office, a customer office, or other fixed or mobile offices capable of communicating and processing machine information. In addition, in the preferred embodiment, the remote monitoring station 108 is adapted to communicate with a remotely located end-user. Examples of end users includes, equipment owners, equipment operators, contractors, rental fleet managers, service/maintenance department managers, and security departments. The remote monitoring station 108 may include one or more computer workstations networked together for communicating with the mobile communicators 106 and the end-users.

Figure 3A:
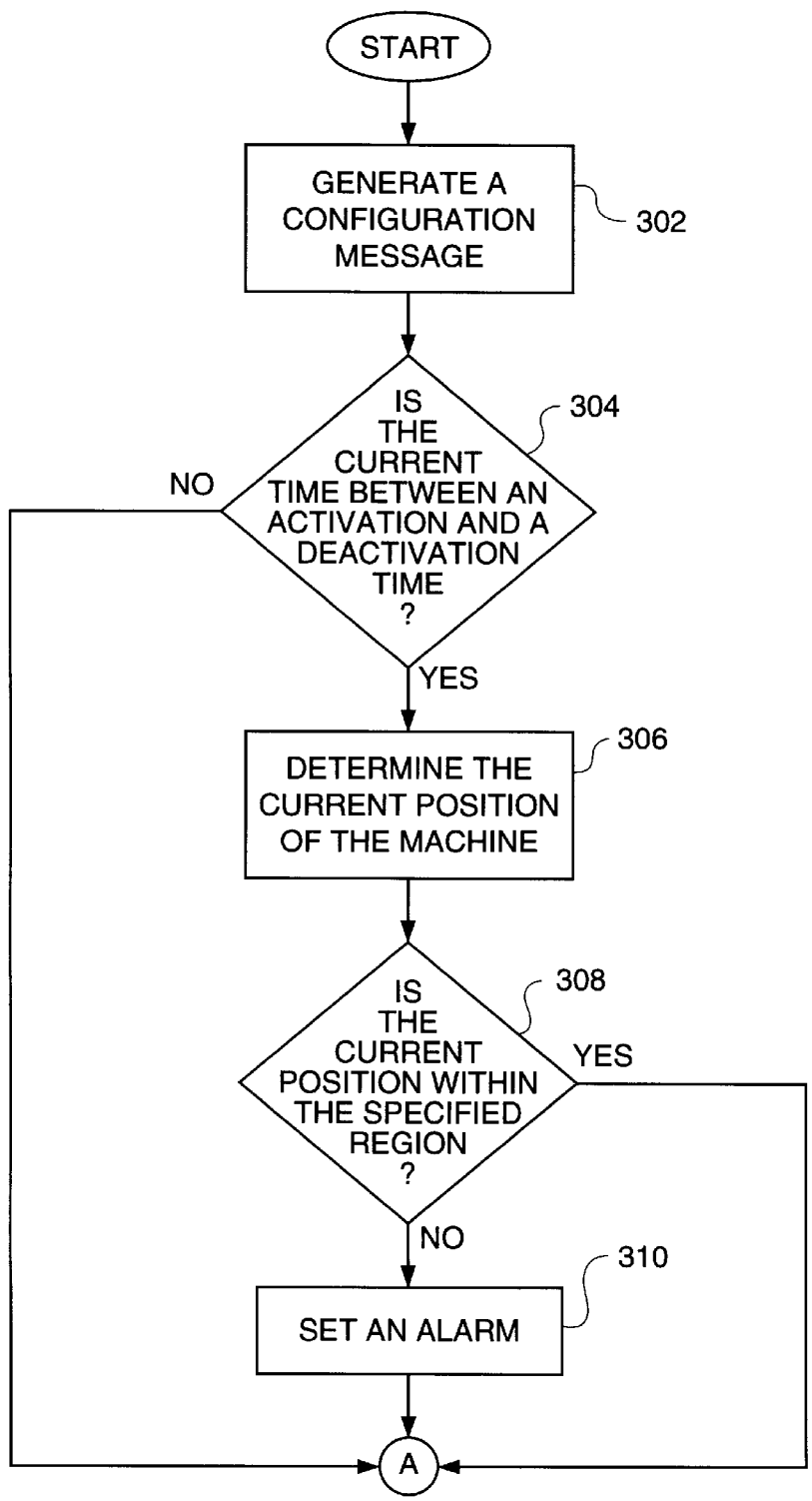
FIG. 3 is an illustration of one embodiment of a method for monitoring the operation of a mobile communicator.

FIG. 3 illustrates one embodiment of the method of the present invention. The present invention includes a method for monitoring the operation of a mobile machine 104. The method includes the steps of receiving a configuration message, having at least one of a geographic data packet, a time data packet, or both, from the remote monitoring station via a wireless communication link, wherein the geographic data packet identifies at least one monitoring region, and the time data packet includes a desired time of operation of the machine, comparing a current machine position to the monitoring region, comparing a current machine time of operation to the desired time of operation, and sending an alarm message to the remote monitoring station in response to either the position comparison or the time of operation comparison.

In a first control block 302, a configuration message is generated by the remote monitoring station 108 and received by the mobile communicator 106. In one embodiment, the end user sets up the configuration message and delivers the message to the remote monitoring station 108. Alternatively, the end user may deliver a partial configuration packet to the remote monitoring station 108. The remote monitoring station 108 may complete the packet by, e.g., providing the necessary formatting, or providing default packet configuration information when needed. The configuration message includes a geographic data packet, a time data packet, or both. In the preferred embodiment, the geographic data packet identifies at least one monitoring region, and may include an associated activation time and a deactivation time for each region. The activation and deactivation time may identify the desired time range during which the machine position is to be monitored. For example, the activation and deactivation time could identify an activation date and time of day, and a deactivation date and time of day. The position may be monitored when the current time of operation falls after the activation time and before the deactivation time. In addition, each region to be monitored may have an associated indicator for determining whether the communicator 106 is to perform inclusion monitoring or exclusion monitoring for the specified region. Inclusion monitoring includes determining if the machine 104 has left the specified monitoring region. In one embodiment, a desired region for the machine to be located during inclusion monitoring is within the specified monitoring region. Exclusion monitoring includes determining if the machine 104 has entered the specified monitored region. In one embodiment, a desired region for the machine to be located during exclusion monitoring, is the region outside the specified monitoring region.

In the preferred embodiment, each specified monitoring region of the geographic data packet includes a center point, e.g., a latitude and a longitude, and a radius. The center point and radius define the region to be monitored. In an alternative embodiment, the geographic packet may include a radius, without a center point. The center point for the region to be monitored may be defined by the mobile communicator 106 as the current position of the mobile communicator 106 at the time the geographic packet is received. In another embodiment, a predefined table of monitoring regions and the monitoring type of each region, e.g., inclusion or exclusion monitoring, may be downloaded to the mobile communicator 106 in advance. Each region may have an associated identifier, or label. The remote monitoring station 108 may then select a region to be monitored via an end-user input, and deliver the region identifier to the mobile communicator 106. The communicator 106 will access a locally stored region table to determine the region to be monitored based on the identifier.

The time packet includes the desired time of operation for the machine 104. For example, the time packet may include: the start of working day, end of working day, and the working day(s) of the week, e.g., Monday through Friday. In an alternative embodiment, the time packet may also include an activation time and a deactivation time within which the time of operation is to be monitored.

When a configuration message has been received by the mobile communicator 106 the monitoring may begin. A determination is made as to whether the machine position is to be monitored. In one embodiment, in a first decision block 304, the current time of operation is determined. If the current time of operation is between the activation and deactivation time for a specified region, then the region will monitored. If the current time falls within the activation and deactivation time for more than one region, then each region will be monitored. If there is a region to be monitored, then, in a second control block 306, the current position of the machine 104 is determined. For example, the current position as determined by the positioning system may be utilized. In a second decision block 308, the current position may be compared with the specified region to be monitored. In one embodiment, a position event is said to occur if the current position does not lie within the desired region associated with the monitored region. If the current position is not within the desired region, then, in a third control block 310, a position alarm may be set. For example, if inclusion monitoring is being performed for a particular monitoring region, then the current position is compared with the monitoring region to determine if the machine 104 is outside the region. If the machine 104 is outside the monitoring region, then an alarm is set. The current position is compared with each of the active monitoring regions to determine if the machine has crossed any of the boundaries as defined by the regions. If any of the regions have been crossed then a position alarm is set.

In a third decision block 312, a determination is made as to whether the time of operation is to be monitored. For example, if the received configuration message includes a time data packet, then, in one embodiment, a monitor time flag may be set. If no time data packet is included then the time flag may be disabled. If the monitor time flag is set, or enabled, then in a fourth decision block 314, a determination is made as to whether the machine is running, or operating. In the preferred embodiment, the machine's battery charging mechanism (not shown) may be monitored to determine if the machine 104 is operating. If the battery is charging, then the machine 104 is running. Other methods of detecting whether the machine 104 is running include monitoring the battery voltage, oil pressure, or the keyswitch state. If the machine is running, then in a fourth control block 316, the current time of operation is determined. The time of operation preferably includes the time of day and the date of operation. In a fifth decision block 318, the current time of operation may be compared with the desired time of operation. If the machine is running, and the current time of operation is not within the desired time of operation of the machine, then a time alarm may be set, in a fifth control block 320.

In a sixth control block 322, a determination is made as to whether any alarms have been set, e.g., a time alarm or position alarm. In one embodiment, the initial occurrence of each alarm may be reported immediately to the remote monitoring station 108. For example, if a position alarm has been set, then the mobile communicator 106 may send a message to the remote monitoring station 108, indicating the current position of the machine 104, and the monitoring region that the machine 104 has crossed. If a time alarm has been set, then the mobile communicator 104 may send a message to the remote monitoring station 114, indicating the current time of operation, and the desired time of operation of the machine 104. In the preferred embodiment, subsequent alarm messages for the same event will not be sent until the alarm has been reset by a message received from the remote monitoring station 114. In one embodiment, if daily reports are sent to the remote monitoring station 114, the reports will indicate the alarm is set. In an alternative embodiment, when an alarm is set, an alarm could be sent on a periodic basis, e.g., hourly. For example, during inclusion monitoring, if a machine 104 leaves a monitored region, a position alarm may be set. In the preferred embodiment, the position alarm will not be reset until the machine 104 has re-entered the monitored region. Therefore, the alarm will be reported when it initially occurs, and in any daily reports that are sent from the mobile communicator 106, until the alarm is reset. Possible methods of resetting the alarm include issuing a command to the mobile communicator 106 from the monitoring station 108, resetting the message through a local data port by an authorized personnel, having a timer based expiration of the alarm, or letting the mobile communicator 106 reset the alarm with the condition no longer exists. For example, when the machine 104 moves back within the desired monitoring region, the alarm may be reset. In an alternative embodiment, an alarm message may be sent each time the machine 104 is started when the current time of operation is outside the desired time of operation. Alternatively the alarm message may be sent periodically, e.g., hourly, until the message has been reset or the issue is resolved, e.g., the machine returns to the desired monitoring region.

The end-user may be notified when an alarm message has been received by the remote monitoring station 108. An end user may configure a reaction table identifying the type of action or notification the end user desires when a regular report or alarm is received from a particular machine. In addition, the end-user may configure a different notification time, action, or method for each machine 104.

In an alternative embodiment, the geographic data packet and the time of operation data packet may be combined such that each region to be monitored may include an activation and deactivation time, and the desired time of operation of the vehicle. Therefore, as the machine 104 operates in different monitoring regions, the specific work hours of that region may be accounted for.

The position and/or time monitoring may be performed continuously when a configuration packet is received, or periodically, or when designated events occur, e.g., the machine is started and is running.

In one embodiment, as illustrated in FIG. 4, a display 402 may be associated with the mobile communicator 106. The display 402 may receive one or more monitoring regions and the current machine position. The display 402 displays the current machine position relative to at least one of the monitoring regions. For example, an icon of a work machine may be used to illustrate the position of the machine. The boundary of the monitoring region may also be illustrated, e.g., a circle illustrating a radius of a monitoring region. In addition, the monitoring region may change colors, or flash, when the controller 210 determines that the machine has crossed the border of the monitoring region. In one embodiment, the position monitoring display may be one of several displays which an operator may select for viewing.

In an alternative embodiment, the display 402 may be associated with the remote monitoring station 108, or an end-user.

Industrial Applicability

The present invention includes a method and apparatus for determining and reporting the arrival or departure of a machine 104 from a specified region, and for determining and reporting the operation of the machine 104 outside of desired time of operation, to a remote monitoring station 108. The machine 104 includes a mobile communicator 106 adapted to communicate with the remote monitoring station 108. The method includes the steps of receiving a configuration message, having at least one geographic data packet, a time data packet, or both, from the remote monitoring station via a wireless communication link, wherein the geographic data packet identifies at least one monitoring region, and the time data packet includes a desired time of operation of the machine, comparing a current machine position to the monitoring region, comparing a current machine time of operation to the desired time of operation, and sending an alarm message to the remote monitoring station in response to either the position comparison or the time of operation comparison.

In one embodiment, the remote monitoring station 104 initializes the setup process by sending a configuration message prepared by the end-user to the mobile communicator 106. The ability to communicate the configuration message over a wireless data link enables a mobile communicator 106 associated with a particular machine 104 to be quickly and easily reconfigured remotely as the machine 104 changes work sites, working shifts, or rentors.

The configuration message may include information regarding one or more specified regions to be monitored, and a desired time of machine operation to be monitored, e.g., an activation time and a deactivation time. Therefore, when the current time is between an activation and deactivation time, then the machine position may be monitored with the specified monitoring regions. If the current position of the machine 106 is outside the monitoring region during inclusion monitoring, for example, then an alarm may be set. If the current position of the machine 106 is inside the monitoring region during exclusion monitoring then an alarm may be set. For example, if an end-user has several service areas, then the present invention can notify the end-user of the arrival of the machine 104 at any of the service areas by specifying the geographical area of each service area and utilizing exclusion monitoring.

The time of operation of the machine 104 may be monitored to determine if the machine 104 is operating during the desired time of operation, e.g., the working hours of the work days. If the machine 104 is determined to be working outside of the desired time of operation, an alarm may be set and sent to the remote monitoring station 108. A reaction table may be configured by the end user to notify the end-user of the report or alarm in a desired manner. For example, in the event of a time of operation alarm, the alarm may be forwarded to an on-shift security officer of a security department identified by the end-user.

Other aspects, objects, advantages and uses of the present invention can be obtained from a study of the drawings, disclosures and appended claims.

What is claimed is:

1. A method for monitoring the operation of a mobile machine, the machine including a mobile communicator adapted to communicate with a remote monitoring station, comprising the steps of:

receiving a configuration message from the remote monitoring station via a wireless communication link, said configuration message including at least one of a geographic data packet and a time data packet, said geographic data packet identifying at least one monitoring region, and said time data packet including a desired time of operation of the machine;

comparing at least one of a current machine position to said monitoring region and a current machine time of operation to said desired time of operation; and sending an alarm message to the remote monitoring station in response said comparison.

2. A method, as set forth in claim 1, wherein said geographic data includes a monitoring activation time and a monitoring deactivation time associated with each of said monitoring regions, said monitoring position being monitored between said activation time and said deactivation time.

3. A method, as set forth in claim 2, wherein each said monitoring region includes an associated monitoring type, said monitoring type including one of an exclusion monitoring indicator and an inclusion monitoring indicator.

4. A method, as set forth in claim 3, wherein said geographic data includes a radius for each of said monitoring regions.

5. A method, as set forth in claim 4, wherein said geographic data includes a center point for each of said monitoring regions, further comprising the step of determining said monitoring region in response to said center point and said radius.

6. A method, as set forth in claim 4, further comprising the step of determining said monitoring region in response to said radius, and said current position of said machine.

7. A method, as set forth in claim 4, further including the step of notifying an end-user of an alarm in response to the remote monitoring station receiving one of a time of operation alarm and a monitoring region alarm.

8. A method, as set forth in claim 7, wherein the step of notifying said end-user includes the step of delivering one of an e-mail, a facsimile, a page, and a visual indicator to said end-user.

9. A method, as set forth in claim 8, wherein the step of notifying said end-user includes the step of accessing a reaction table, said reaction table including and end-user identifier and a end-user defined notification technique.

10. A method, as set forth in claim 9, including the step of delivering a partial configuration packet to said remote monitoring station from said end-user, said partial configuration packet including at least one of said geographic packet and said time of operation packets.

11. A method, as set forth in claim 9, wherein said wireless communication media includes one of a satellite communication link and a cellular telephone link.

12. A method, as set forth in claim 11, wherein the step of comparing said current position includes the steps of:

setting an alarm when said current position is outside said monitored region and said inclusion monitoring is being performed; and setting said alarm when said current position is inside said monitored region and said exclusion monitoring is being performed.

13. A method, as set forth in claim 12, further including the step of resetting said alarm in response to one of a reset message from a local data port message, a reset message from said remote monitoring station, a timer based expiration, and a position based resetting.

14. A method as set forth in claim 12, including the steps of:

resetting said alarm when said current machine position is inside said monitored region and said inclusion monitoring is being performed; and resetting said alarm when said current machine position is outside said monitored region and said exclusion monitoring is being performed.

15. A method, as set forth in claim 14, wherein the step of comparing said current time of operation includes the steps of:

determining if said machine is running; and setting an alarm when said current time of operation is outside said desired time of operation and said machine is running.

16. A method as set forth in claim 15, including the step of resetting said alarm when said machine is not running.

17. A method, as set forth in claim 15, including the step of displaying said monitoring region and said current machine position to an operator.

18. A method, as set forth in claim 17, wherein said operator is one of an on-board operator, a remote operator, and an end-user.

19. A method for monitoring the operation of a mobile machine, the machine including a mobile communicator adapted to communicate with a remote monitoring station, comprising the steps of:

receiving a configuration message from the remote monitoring station via a wireless communication link, said configuration message including at least one of a geographic data packet and a time data packet;

wherein said geographic data packet identifies at least one monitoring region;

wherein said time data packet includes a desired time of operation of the machine;

comparing a current machine position to said monitoring region;

comparing a current machine time of operation to said desired time of operation; and sending an alarm message to the remote monitoring station in response to one of said position comparison and said time of operation comparison.

20. A system adapted to monitor the operation of a mobile machine, comprising:

a remote monitoring station adapted to generate a configuration message, said message including at least one of a geographic data packet and a time data packet, said geographic data packet identifying at least one monitoring region, and said time data packet identifying a desired time of operation of the machine;

a mobile communicator adapted to receive said configuration message and responsively compare at least one of a current machine position to said monitoring region and a current machine time of operation to said desired time of operation, and send an alarm message to said remote monitoring station in response said comparison; and a wireless communication link adapted to deliver said configuration message from said remote monitoring station to said mobile communicator.

21. A system, as set forth in claim 20, wherein said geographic data includes a monitoring activation time and a monitoring deactivation time associated with each of said monitoring regions, said monitoring position being monitored between said activation time and said deactivation time.

22. A system, as set forth in claim 21, wherein each said monitoring region includes an associated monitoring type, said monitoring type including one of an exclusion monitoring indicator and an inclusion monitoring indicator.

23. A system, as set forth in claim 22, wherein said geographic data includes a radius for each of said monitoring regions.

24. A system, as set forth in claim 23, wherein said geographic data includes a center point for each of said monitoring regions, and wherein said mobile communicator is adapted to determine said monitoring region in response to said center point and said radius.

25. A system, as set forth in claim 23, wherein said mobile communicator is adapted to determine said monitoring region in response to said radius and said current position of said machine.

26. A system, as set forth in claim 23, wherein said remote monitoring facility is adapted to deliver an end-user notification to an end-user in response to receiving one of a time of operation alarm and a monitoring region alarm from said mobile communicator.

27. A system, as set forth in claim 26, wherein the step of notifying said end-user includes delivering one of an e-mail, a facsimile, a page, and a visual indicator to said end-user.

28. A system, as set forth in claim 27, wherein the step of notifying said end-user includes accessing a reaction table, said reaction table including and end-user identifier and a end-user defined notification technique.

29. A system, as set forth in claim 20, wherein said wireless communication media includes one of a satellite communication link and a cellular telephone link.

30. A system, as set forth in claim 28, wherein said mobile communicator is further adapted to set an alarm when said current position is outside said monitored region and said inclusion monitoring is performed, and set said alarm when said current position is inside said monitored region and said exclusion monitoring is performed.

31. A system, as set forth in claim 20, further comprising a display in communication with said mobile communicator, said display being adapted to receive and display at least one said monitoring region and adapted to receive and display said current machine position.

32. A system, as set forth in claim 20, further comprising a display in communication with said remote monitoring station, said display being adapted to receive and display at least one said monitoring region and adapted to receive and display said current machine position.

* * * * *